(12) United States Patent
Brueck et al.

(10) Patent No.: US 11,326,946 B2
(45) Date of Patent: May 10, 2022

(54) INTEGRATED BOUND-MODE SPECTRAL SENSORS WITH CHIRPED GRATINGS

(71) Applicant: UNM RAINFOREST INNOVATIONS, Albuquerque, NM (US)

(72) Inventors: Steven R. J. Brueck, Albuquerque, NM (US); Payman Zarkesh-Ha, Albuquerque, NM (US); Alexander Neumann, Albuquerque, NM (US)

(*) Notice: Subject to any disclaimer, the term of this patent is extended or adjusted under 35 U.S.C. 154(b) by 0 days.

(21) Appl. No.: 16/605,529

(22) PCT Filed: May 22, 2018

(86) PCT No.: PCT/US2018/033981
§ 371 (c)(1),
(2) Date: Oct. 16, 2019

(87) PCT Pub. No.: WO2018/217823
PCT Pub. Date: Nov. 29, 2018

(65) Prior Publication Data
US 2020/0124474 A1    Apr. 23, 2020

Related U.S. Application Data

(60) Provisional application No. 62/509,346, filed on May 22, 2017.

(51) Int. Cl.
*G01J 3/24* (2006.01)
*G01J 3/28* (2006.01)
(Continued)

(52) U.S. Cl.
CPC ............... *G01J 3/24* (2013.01); *G01J 3/2803* (2013.01); *G02B 6/12009* (2013.01); *G01J 3/0259* (2013.01); *G02B 2006/12061* (2013.01)

(58) Field of Classification Search
CPC .......... G01J 3/24; G01J 3/2803; G01J 3/0259; G01J 3/1804; G01J 3/0218; G01J 3/0262;
(Continued)

(56) References Cited

U.S. PATENT DOCUMENTS

| 5,101,459 A | 3/1992 | Sunagawa |
| 5,442,169 A * | 8/1995 | Kunz ............... G01D 5/26 250/227.18 |

(Continued)

FOREIGN PATENT DOCUMENTS

| JP | 2000258342 A | 9/2000 |
| WO | 2015177974 A1 | 11/2015 |

(Continued)

OTHER PUBLICATIONS

International Preliminary Report on Patentability in corresponding International Application No. PCT/US2018/033981, 6 pages.

(Continued)

*Primary Examiner* — Ryan A Lepisto
*Assistant Examiner* — Erin D Chiem
(74) *Attorney, Agent, or Firm* — MH2 Technology Law Group LLP

(57) ABSTRACT

Provided is a spectral sensor array, including: a planar waveguide on a substrate; a chirped input coupling grating, wherein the chirped input coupling grating comprises a transverse chirp to provide a spectrally selective coupling of incident light into the planar waveguide; an output coupling grating; and an array of photodetectors arranged to receive the light coupled out of the waveguide.

14 Claims, 9 Drawing Sheets

(51) Int. Cl.
*G02B 6/12* (2006.01)
*G01J 3/02* (2006.01)
*G01J 3/18* (2006.01)

(58) Field of Classification Search
CPC ...... G02B 6/12009; G02B 2006/12061; G02B 2006/12107
See application file for complete search history.

(56) References Cited

U.S. PATENT DOCUMENTS

| | | |
|---|---|---|
| 9,497,380 B1 | 11/2016 | Jannard et al. |
| 2015/0207290 A1 | 7/2015 | Brueck et al. |
| 2017/0108375 A1 | 4/2017 | Brueck et al. |

FOREIGN PATENT DOCUMENTS

| | | | | |
|---|---|---|---|---|
| WO | WO-2015191557 A1 | * | 12/2015 | ....... H01L 31/02164 |
| WO | 2018217823 A1 | | 11/2018 | |

OTHER PUBLICATIONS

PCT International Search Report and Written Opinion dated Aug. 23, 2018 in International Application No. PCT/US2018/033981, 7 Pages.

International Search Report and Written Opinion dated Mar. 4, 2021 in corresponding International Application No. PCT/US2020/061192, 8 pages.

* cited by examiner

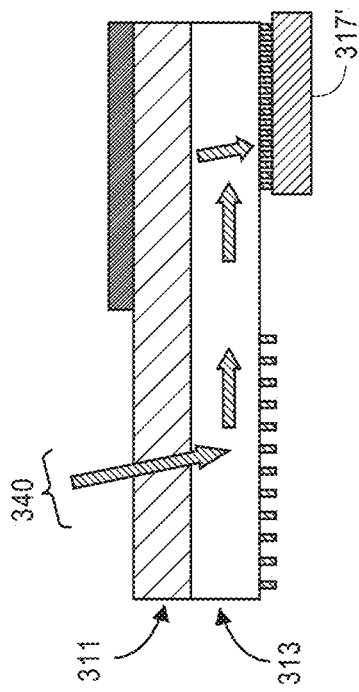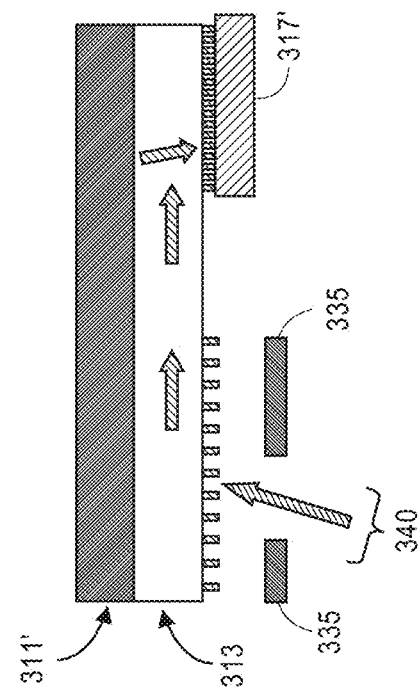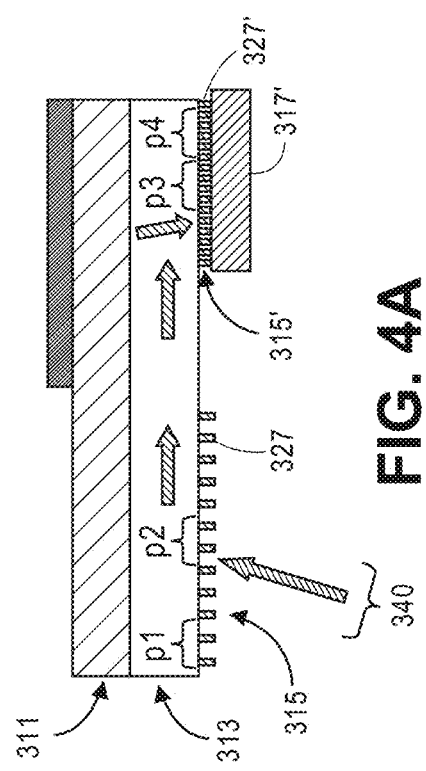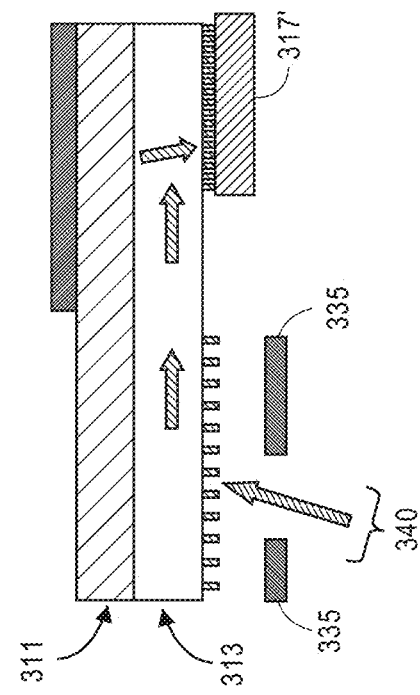
FIG. 4A
FIG. 4B
FIG. 4C
FIG. 4D

INTEGRATED BOUND-MODE SPECTRAL SENSORS WITH CHIRPED GRATINGS

CROSS-REFERENCE TO RELATED APPLICATIONS

This application claims priority to U.S. Provisional Patent Application Ser. No. 62/509,346, filed May 22, 2017, the entirety of which is incorporated herein by reference.

GOVERNMENT RIGHTS

This disclosure was made with Government support under Contract No. EEC0812056 awarded by the National Science Foundation. The Government has certain rights in the invention.

FIELD

This disclosure is generally directed to the field of spectrophotometric sensing and specifically to the use of integrated bound-mode spectral/angular sensors with no moving parts.

BACKGROUND

The ongoing conversion of indoor lighting to energy efficient LED systems offers enormous opportunity for increasing the functionality of lighting from today's modest on/off/dimming control to a new Smart Lighting paradigm that takes advantage of LEDs' electronic compatibility and flexibility. This new lighting paradigm includes lighting for enhanced worker/student productivity, health effects such as circadian entrainment reinforcing the human sleep/wake cycle, visible light communications (VLC) to alleviate the growing wireless bottleneck, and occupancy/activity sensing to provide custom lighting.

Attempts at developing technology for smart lighting components include focal plane color filters for application to the color pixels of digital cameras. Surface plasma wave (SPW) enhancement of semiconductor detectors has been extensively investigated in the infrared spectral region. Typically, in the IR the approach is to couple to a SPW bound to the metal-semiconductor interface. This allows the use of a thinner absorption region (with, therefore, lower noise currents) and a longer absorption path (along the pixel rather than across the junction depth). However, this approach is not appropriate for the visible spectrum due to the high, and strongly varying, absorption of silicon across the visible spectrum. Another issue is the small scale of the required grating which is ~λ/n with n, the semiconductor refractive index, of 4 to 5 for silicon across the visible spectrum. Additionally, limitations of the SPW approach include: 1) the relatively high metal optical losses in the visible restrict the available bandwidths; spectral widths are typically 100 to 200 nm, an order of magnitude larger than the desired bandwidths; and 2) the transmission is low, typically no larger than 10%, limiting the sensitivity of the measurement.

FIG. 1A shows a prior art integrated bound-mode spectral sensor 10 of PCT/US2015/034868 which is commonly owned by the present assignee. The bound-mode spectral sensor 100, which is a single wavelength selective element, is based on grating coupling to a transparent waveguide 113 in a region separated from an active photodetector, and decoupling with a second grating above a photosensitive (p-n junction) area 117, i.e., a photodetector. The waveguide comprises a bottom cladding (121), a higher index core region (123), and a top cladding (125). Incident light (140) is coupled into the waveguide by grating (127) in region 140' and outcoupled by a second grating (127') in region (140") over the photosensitive p-n or n-p junction (117). A cover (128) shields the photosensitive area 117 from direct illumination. With this sensor, the energy coupled into the waveguide is a function of both wavelength and angle of incidence as described by the grating coupling equation (Eq. 1), $$\frac{2\pi \sin\theta_{in}}{\lambda_{in}} + j\frac{2\pi}{d} = \pm k_{mode}(\lambda_{in}), \quad (1)$$

where $\theta_{in}$ is the angle of incidence ($-1 < \sin\theta_{in} < 1$), j is an integer ($\pm 1, \pm 2, \ldots$) representing the grating order, $\lambda_{in}$ is the incident wavelength, d is the grating period, and $k_{mode}(\lambda_{in})$ is the modal wave vector typically given by a dispersion relation that takes into account the waveguide structure and materials and the incident wavelength.

In order to provide measurement for a spectrum of the incident light, rather than just a single-wavelength, FIG. 1B shows a prior art integrated bound-mode spectral sensor of PCT/US2015/034868 having an array of discrete elements 100-1 and 100-2, each with different grating periods (denoted as $p_1$ and $p_2$) than the other, along with the associated detection regions (not visible). The gratings of the discrete elements 100-1 and 100-2 are not continuous (i.e., there is a gap between gratings of one element and the gratings of the other element).

As described in PCT/US2015/034868 one or more lithography and pattern transfer steps are used to define the in-coupling and out-coupling regions. Thus, the integrated bound-mode spectral sensors described therein may be limited by the resolution of the available optical lithography tool and/or the available step size for the grating period(s). For example for the 180 nm node, for which lithography tools are available in the sensor industry which is several generations behind the microprocessor and memory industries, the minimum pitch is 360 nm and the typical step size is 5 nm (e.g. gratings are available at pitches of 360 nm, 365 nm, 370 nm, and the like). For some applications, this step size is too coarse to provide the needed resolution. Additionally, at this minimum pitch it is necessary to tilt the sensor relative to the incident light to cover the entire visible spectral region which makes sensor installation and maintaining a low profile more difficult. For example, FIG. 2 shows the calculated coupling wavelength as a function of the angle of incidence for different grating pitches as provided in PCT/US2015/034868. As shown, at normal incidence, a grating pitch range of ~400 nm to 220 nm is required to cover the full 400-700 nm visible range of light. With a 360 nm minimum pitch, a tilt angle of ~20° is required to cover this full range.

Additionally, as described in PCT/US2015/034868, further standard lithography/etch/metal deposition/annealing steps are used to provide the electrical contacts and the cover over the p-n junction to protect it from direct illumination. However, because the grating is monolithically integrated with the CMOS detectors, waveguide materials that can survive the temperatures associated with back-end CMOS processing steps, such as contact metal depositions and annealing, are required.

There are many applications for spectrophotometric measurements for control of LED lighting, for manufacturing process control, fiber optic communications, and many other applications. While a spectrometer coupled to a detector can provide the necessary resolution, there is an increasing need for inexpensive, compact, no-moving-parts (e.g. no grating rotation) solutions.

SUMMARY

This invention relates to the use of a chirped grating (a grating with a transverse period that varies with position) along with a planar waveguide and a linear array of photosensitive CMOS detection areas to provide a spectral sensitivity for a fixed angle of incidence. In some embodiments, the planar waveguide is integrated onto the same silicon substrate as the CMOS detection areas. In other embodiments, the planar waveguide is and the grating couplers are fabricated on a separate substrate and mechanically interfaced to the Si substrate containing the CMOS detection areas. In other embodiments, multiple such devices are arranged at angles one to another to provide both angular and spectral (e.g. plenoptic) information on the incident light field.

Accordingly, in an implementation, there is a spectral sensor array, comprising: a planar waveguide on a substrate; a chirped input coupling grating, wherein the chirped input coupling grating comprises a transverse chirp to provide a spectrally selective coupling of incident light into the planar waveguide; an output coupling grating; and an array of photodetectors arranged to receive the light coupled out of the waveguide.

In another implementation there is a method for forming a spectral sensor array, comprising: providing a planar waveguide on a substrate; forming a chirped input coupling grating, wherein the chirped input coupling grating comprises a transverse chirp to provide a spectrally selective coupling of incident light into the planar waveguide; forming an output coupling grating; and providing an array of photodetectors arranged to receive the light coupled out of the waveguide.

In yet another implementation, there is a plenoptic sensor array comprising: a multiplicity of spectral sensor arrays mounted at multiple angles to normal to provide a spectral response at multiple angles of incidence.

In yet another implementation, there is a plenoptic sensor array comprising: a multiplicity of spectral sensor arrays mounted in a plane, wherein each of the spectral sensor arrays comprises different coupling gratings to provide angular sensitivity across a spectral band.

Advantages of at least one embodiment include decoupling of the waveguide from the CMOS detector. An advantage of at least one embodiment includes greatly increasing the material systems available for grating and waveguide fabrication. An advantage of an embodiment includes eliminating high temperature steps that can lead to imperfections (microfractures) and scattering in the waveguides. An advantage of an embodiment includes taking advantage of the availability of commercial linear detector arrays.

Additional advantages of the embodiments will be set forth in part in the description which follows, and in part will be understood from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIGS. 4A-4D are cross-sectional views of various implementations of the integrated bound mode detector of FIGS. 3A-3B using transparent substrate materials (FIGS. 4A-4B), using transparent substrate materials and having a restrictor that restricts the range of input angles of incident light (FIG. 4C), and using opaque substrate materials and having a restrictor that restricts the range of input angles of incident light (FIG. 4D).

DETAILED DESCRIPTION OF THE EMBODIMENTS

Figure 1A:
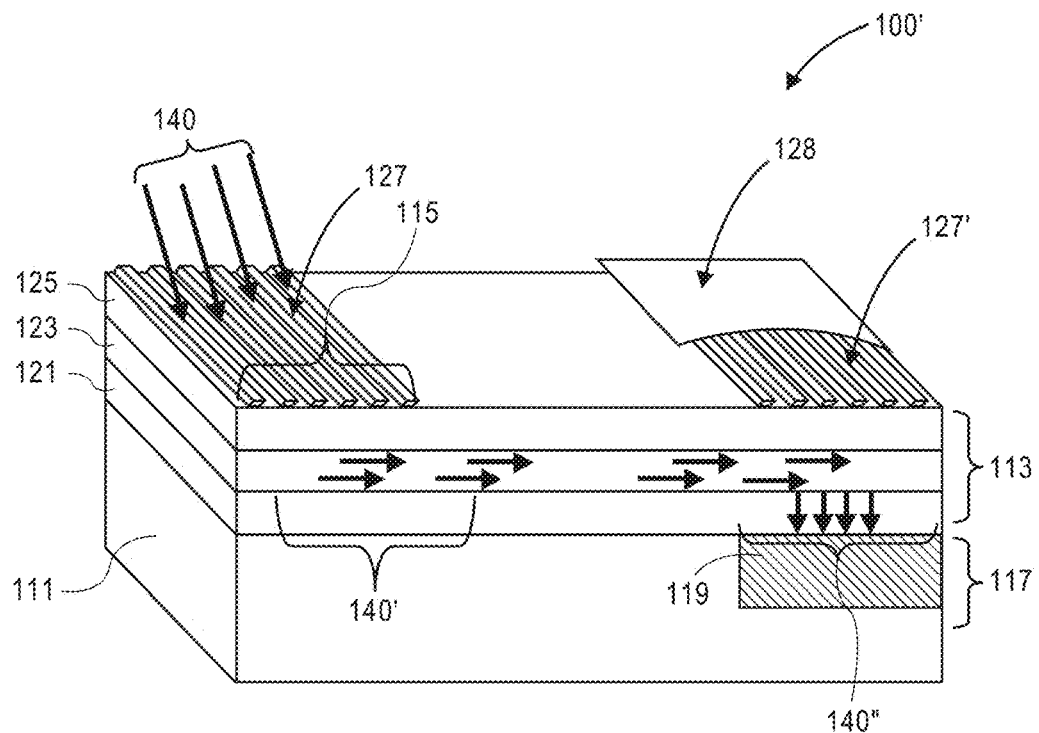
FIG. 1A (prior art) shows a single pixel of a prior art integrated bound mode detector wherein the light is coupled into a waveguide in a region displaced from the detection element and coupled out of the waveguide over a photosensitive junction area.

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

A CMOS-compatible spectral sensor array 300 is described herein. As illustrated in the top-view of FIG. 3A, the cross-section B-B' of FIG. 3B, and the cross-section C-C' of FIG. 3C, the CMOS-compatible spectral sensor array 300 comprises a waveguide 313 on a substrate 311 and arranged over an array of photodetectors, for example, a plurality of CMOS photodetectors 317'.

Coupling of electromagnetic radiation into the waveguide 313, in a region displaced from the CMOS photodetectors 317', is provided by an input coupler. The input coupler comprises a chirped input coupling grating 315 having periodic, continuous chirped grating lines 327 such as a plurality of dielectric fingers. A period p of the chirped gratings is a function of position, both in a transverse and longitudinal direction. For example, in FIG. 3B, period $p_1$ of grating lines 327 at a first location of the chirped input coupling grating 315 may be the same or different than period $p_2$ of chirped grating lines 327 at a second location of the chirped input coupling grating 315 longitudinal from the first direction. Additionally, the local period $p_1$ of chirped grating lines 327 at the first location of the chirped input coupling grating 315 may be the same or different than the local period $p_5$ of the chirped grating lines 327 at a third location of chirped input coupling grating 315 that is transverse from the first location. Further still, the local period $p_2$ of chirped grating lines 327 at the second location of chirped input coupling grating 315 may be the same or different than the local period $p_6$ of the chirped grating lines 327 at a fourth location of chirped input coupling grating 315 transverse from the second location. In this manner, spectral sensor array 300 can be configured to accept incoming light of various wavelengths from $\lambda$ to $\lambda_n$ at different locations of chirped input coupling grating 315. Accordingly, in an implementation, the chirped input coupling grating comprises at least a transverse chirp to provide a spectrally selective coupling of incident light into the planar waveguide. Accordingly, the spectral composition of the light coupled into the waveguide 313 varies as a result of the variation of the grating period along the length of the grating.

Figure 3C:
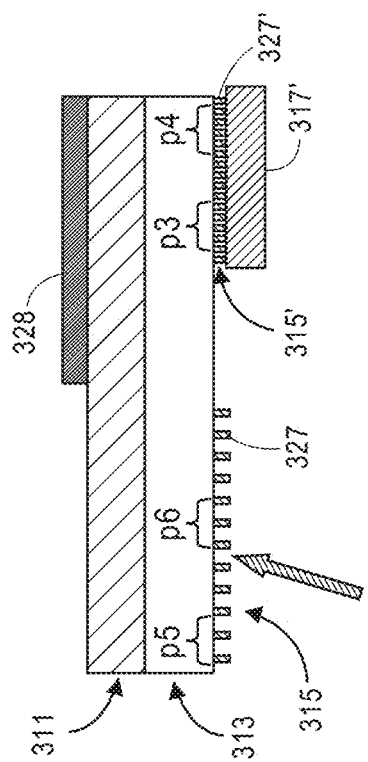
FIG. 3C is a cross-sectional illustration of the integrated bound mode detector of FIG. 3A along cut-through lines C-C'.
Figure 3B:
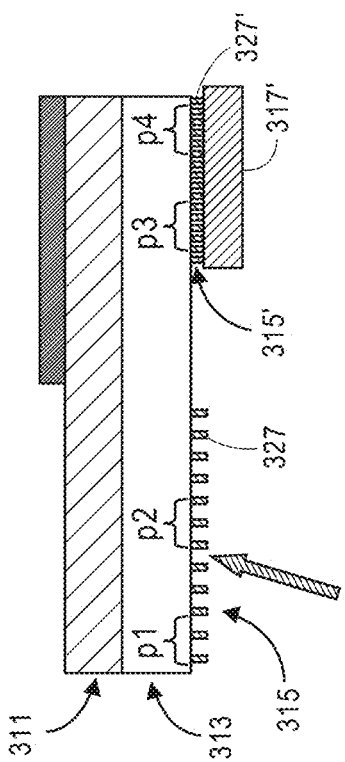
FIG. 3B is a cross-sectional illustration of the integrated bound mode detector of FIG. 3A along cut-through lines B-B'.
Figure 3A:
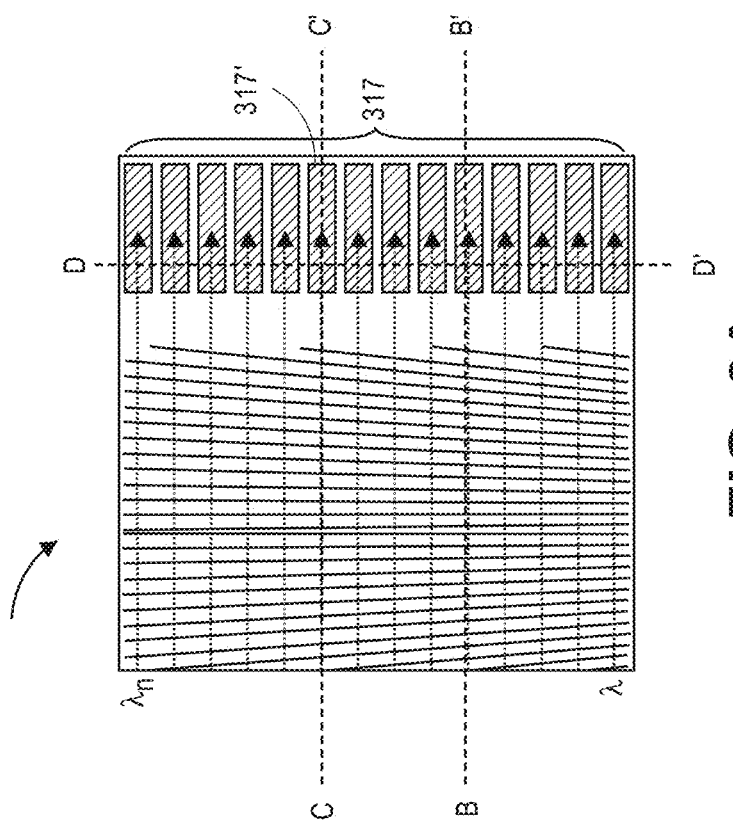
FIG. 3A is a top view schematic of an integrated bound mode detector having a chirped input grating and a fixed period output grating according to an embodiment.

Meanwhile, outcoupling of the radiation from the waveguide 313 to the individual detector elements of photodetectors 317' is provided by output coupling grating 315' comprising periodic grating lines 327' which may be chirped longitudinally but may not be chirped transversely. In an implementation, output coupling grating 315' comprises a fixed grating, where a period p of the grating lines 327' does not change as a function of position. For a fixed period output coupler such as shown in FIGS. 3A-3C, the directionality of the light coupled out of the waveguide will vary for different spectral regions. Accordingly, design of photosensitive regions (e.g., area and distance from the waveguide) will require modification to ensure proper detection of light across the spectrum. In an implementation, output coupling grating 315' comprises more than one period of the grating lines 327' in a longitudinal direction. In an implementation, output coupling grating 315' can comprise a chirped grating formed of a plurality of grating lines 327', where the period p of the grating lines 327', function of longitudinal position such that a period $p_3$ of grating lines 327' at a first location is different than period $p_4$ of grating lines 327' at a second location. However, because output coupling grating 315' may comprise fixed grating lines 327', the periods $p_3$ and $p_4$ for grating lines 327' in FIG. 3B remain substantially the same as grates $p_3$ and $p_4$ for grating lines 327' in FIG. 3C (e.g., no transverse chirp).

Figure 3D:
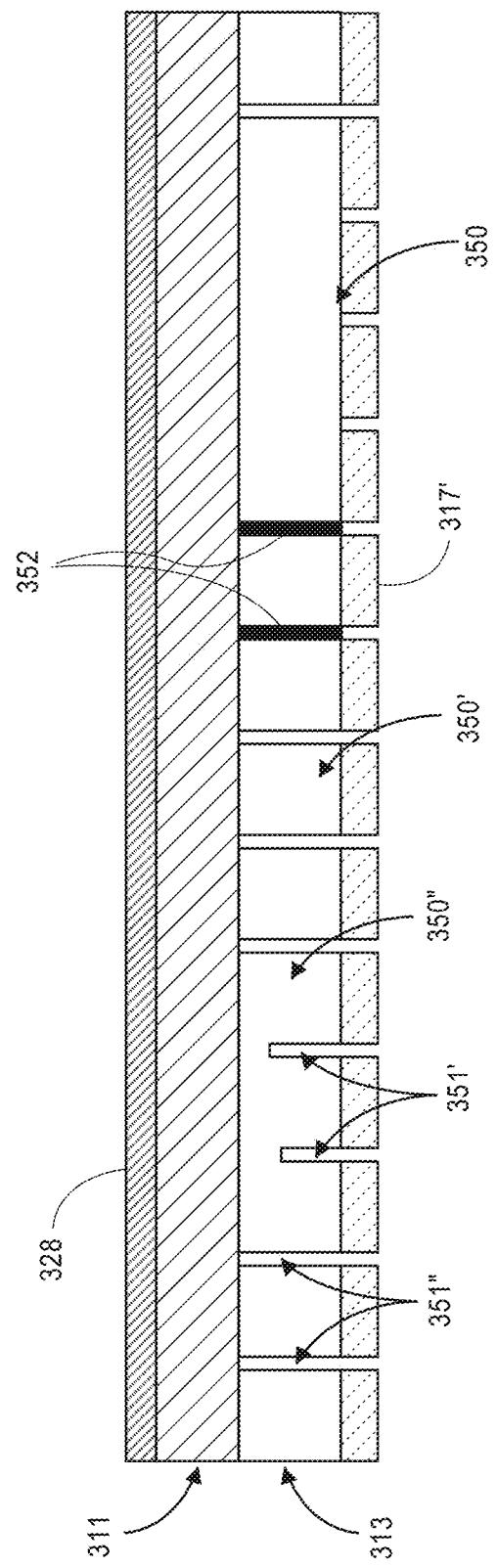
FIG. 3D is a cross-sectional illustration of the integrated bound mode detector of FIG. 3A along cut-through lines D-D'.

According to the cross-sectional view of FIG. 3D along cut-through D-D' of FIG. 3A, in some embodiments the waveguide 313 may be a continuous waveguide 350 that extends across multiple ones photodetectors 317'. In some embodiments, trenches 351' and 351" may be etched in regions between adjacent ones of the photodetectors 317'. The trenches may be etched to partially (351") or completely (351') extend through a thickness of the waveguide 313 to minimize cross-coupling between the various spectral regions. Additionally, the trenches may be partially to completely filled with a material 352 that is opaque in the wavelength range of interest to minimize cross-coupling between the spectral regions. In other embodiments this extra processing step may not be necessary to the proper functioning of the spectral resolution.

As shown by the directional arrows in FIGS. 4A-4D, in operation, incident light 340 is coupled to the waveguide 313 at a specific wavelength and incident angle at a coupling region defined by chirped input coupling grating 315, providing a spectral/angular filtering function. The light is then out-coupled from the waveguide 313 downstream from the coupling region at an output coupling grating 315' adjacent to one of the photodetectors 317' comprising at least one p-n junction. As light is out-coupled from the waveguide 313 at out-coupling grating 315' to all of the photodetectors of the array of photodetectors 317, the array of photodetectors generate an array of electrical signals corresponding to the spectra of the incident light.

The waveguide 313 may be a dielectric waveguide and may include a first low index cladding layer, a high index confinement layer, and a second low index cladding layer (e.g., a $SiO_2/Si_3N_4/SiO_2$ waveguide) disposed over substrate 311. The first low index cladding layer and the second low index cladding layer may each comprise $SiO_2$. The high index confinement layer may comprise $Si_3N_4$. The refractive indices of the waveguide layers can be: $SiO_2$–1.5, $Si_3N_4$~2.2, but are not so limited. The layers of the waveguide structure may be transparent across the visible spectrum. One of ordinary skill will understand that other material combinations for the waveguide layers are available and are included herein without explicit reference.

Figure 1B:
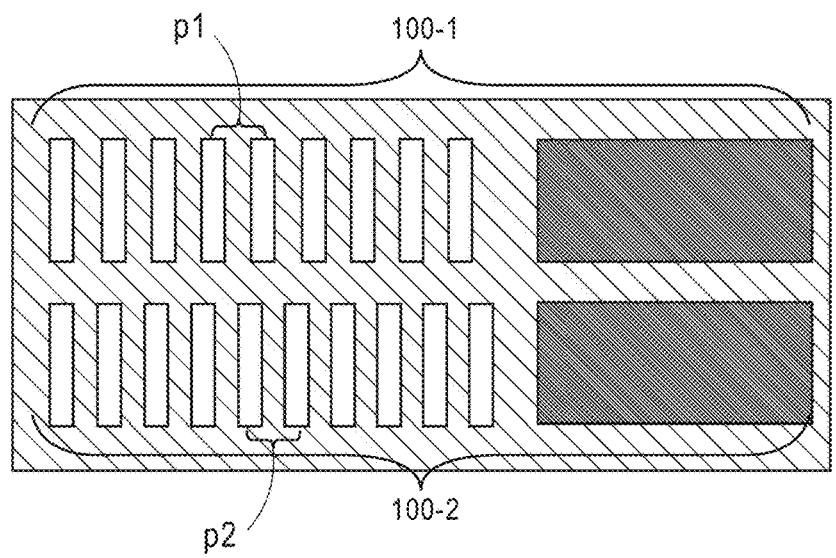
FIG. 1B (prior art) shows a top-view of two integrated bound mode detector elements of FIG. 1A, wherein the two coupling gratings of each detector element are at different pitches, thereby providing a spectral discrimination.

In an embodiment, the waveguide 313 is fabricated on a same silicon substrate as the CMOS compatible photosensitive areas (e.g., photodetectors 317) similar to that of FIG. 1A, with the exception that a chirped input coupling grating 315 having continuous variation in periodicity for gratings in both transverse and longitudinal directions is used in place of the fixed grating 115 of FIG. 1A or the discrete gratings of FIG. 1B.

In an embodiment, the planar waveguide 313 and the chirped input coupling grating 315 can be fabricated on a substrate 311 separate from the array of photodetectors and that is subsequently mechanically connected onto the array of photodetectors formed on a different substrate. The separate substrate 311 can be either optically transparent across the wavelength range of interest (for example, glass or a transparent polymer) as in FIGS. 4A-4C, or opaque in the wavelength range of interest (for example a silicon wafer for visible spectral measurements) as in FIG. 4D. In other words, the substrate may be transparent at predetermined wavelengths of interest or opaque at predetermined wavelengths of interest. A significant advantage of fabricating the waveguide 313 and chirped input coupling grating 315 is that it separates the fabrication processes for the planar waveguide and the coupling gratings (described below and illustrated in FIGS. 5A-5B) from the fabrication of the CMOS detector array. This greatly increases the material choices and in some cases the material quality (eliminating stresses and resultant non-uniformities) for the waveguide and coupling gratings since the thermal excursions necessary for CMOS fabrication are eliminated. This configuration also allows the use of commercially available linear photodiode arrays.

For a transparent substrate the light 340 can be incident from either side of the substrate. For example, as shown in FIG. 4A, light 340 can be incident from the side on which the chirped input coupling grating 315 is disposed. Alternatively (or in addition), as shown in FIG. 4B, light 340 can be incident from a surface of the substrate 311 and pass through substrate 311 to waveguide 311. As illustrated in FIG. 4D, for an opaque substrate 311', the light must be incident on the waveguide side (e.g. the same side that the silicon photodetectors are mechanically affixed). Meanwhile, because grating coupling depends on both the wavelength and the angle of incidence of light input to the device, an additional filtering structure, such as a restrictor 335 that restricts the range of input angles can be used to resolve angular-wavelength degeneracy of the spectral sensor array 300 as illustrated in FIG. 4C. In other words, the restrictor comprises an aperture that restricts angular acceptance of the light incident to the input chirped input coupling grating 315. In an embodiments, restrictor 335 comprises a beam block having an appropriate aperture and disposed an appropriate distance above chirped input coupling grating 315. The light aperture reduces the angular spread of the light 340 incident on a particular device element, thus eliminating the degeneracy.

Additionally, the distance between the output coupling grating 315' and the photosensitive areas can be varied over a wide range since the light coupled out of the waveguide is propagating in free space. Due consideration is necessary to the need for this light to impinge on the photosensitive detection areas (photodetectors 317) and to avoid cross coupling due to the diffractive spreading of the out-coupled light. This configuration can be easily adapted to different wavelength regions where, for example, a silicon substrate can be used for the waveguide while a different III-V material is used for the detectors as would be necessary for telecommunications applications at near infrared wavelengths.

Different widths along the propagation region can be provided for the input and output coupling gratings. The grating parameters (for example coupling strength) can be adjusted to maximize the quantum efficiency of the overall arrangement, e.g. photons in the electron-hole pairs collected in the CMOS photodetectors. An advantage of a strong coupling at the output is that smaller detectors can be used to reduce noise and increase device speed.

Depending on the wavelength range addressed in the measurement (e.g. about 400 nm to about 700 nm for a visible spectrum; about 1.3 µm to 1.6 µm for telecommunications; about 3 µm to about 5 µm for molecular sensing), there can be significant variation in the detector sensitivity across the relevant spectral band. For example, silicon detectors have significantly greater responsivity in the red that in the blue parts of the spectrum. Accordingly, signal conditioning will be necessary to equalize the signal strengths across the spectrum to present an accurate spectral measurement. Accordingly, in an embodiment, a sensor array can comprise electronics to receive and condition the electrical signals from the linear array of photodetectors to provide a spectrum of the incident light.

Chirp is a measure of change in period across the gratings. Interferometric lithography with curved wavefronts can be used to form chirped gratings in which chirped gratings result from the interference of two coherent beams with curved wavefronts. The chirp can be longitudinal, with the periodicity changing along the grating wavevector (which contributes to the resolution), and/or transverse, with the periodicity changing in the perpendicular direction (which provides spectral discrimination between adjacent photosensitive elements). There are applications for both transverse chirped gratings where the dominant chirp is in the direction perpendicular to the grating wavevector and for longitudinal chirped gratings where the dominant chirp is in the same direction as the grating wavevector. For many applications, the ratio of these two chirps is an important figure of merit (FoM) for grating fabrication. Maximizing this ratio maximizes transverse chirp while minimizing longitudinal chirp and vice versa. The FoM can be modified by shifting a sample at an angle relative to the optical axis. The ratio of the transverse chirp and the longitudinal chirp can be modified by grating fabrication parameters as described below in FIGS. 5A-5B.

Chirped gratings of the embodiments, such as chirped input coupling grating 315, therefore, can be fabricated by interferometric lithography, including via known techniques such as those described in U.S. Pat. Nos. 8,908,727 and 9,431,789 which are commonly owned by the present assignee, and Benoit, S., "*Design of Chirped Gratings Using Interferometric Lithography*," IEEE Photonics Journal, Vol. 10, No. 2 (April 2018), the entireties of which are incorporated herein by reference.

Figure 2:
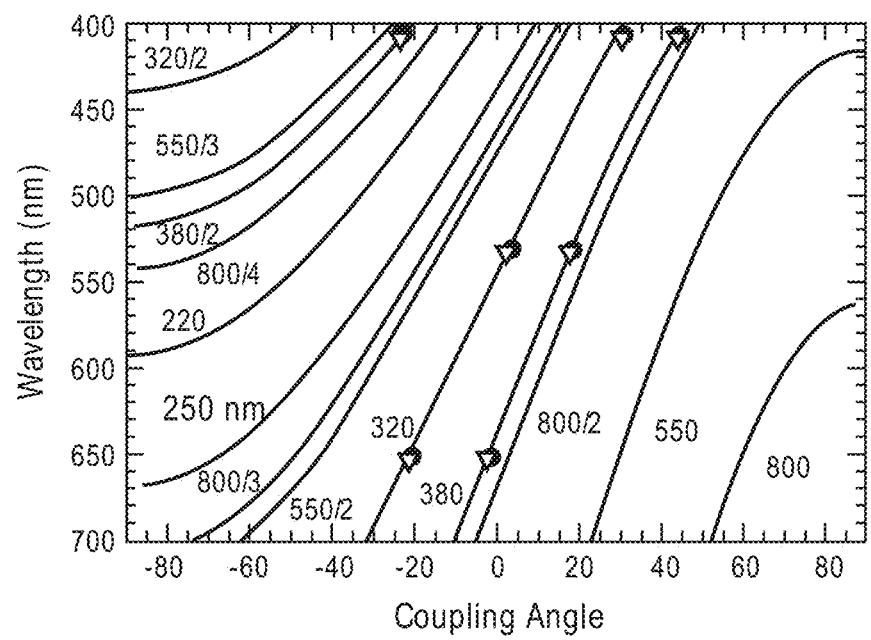
FIG. 2 (prior art) shows the calculated coupling wavelength vs. angle of incidence for different values of the grating pitch.
Figure 5A:
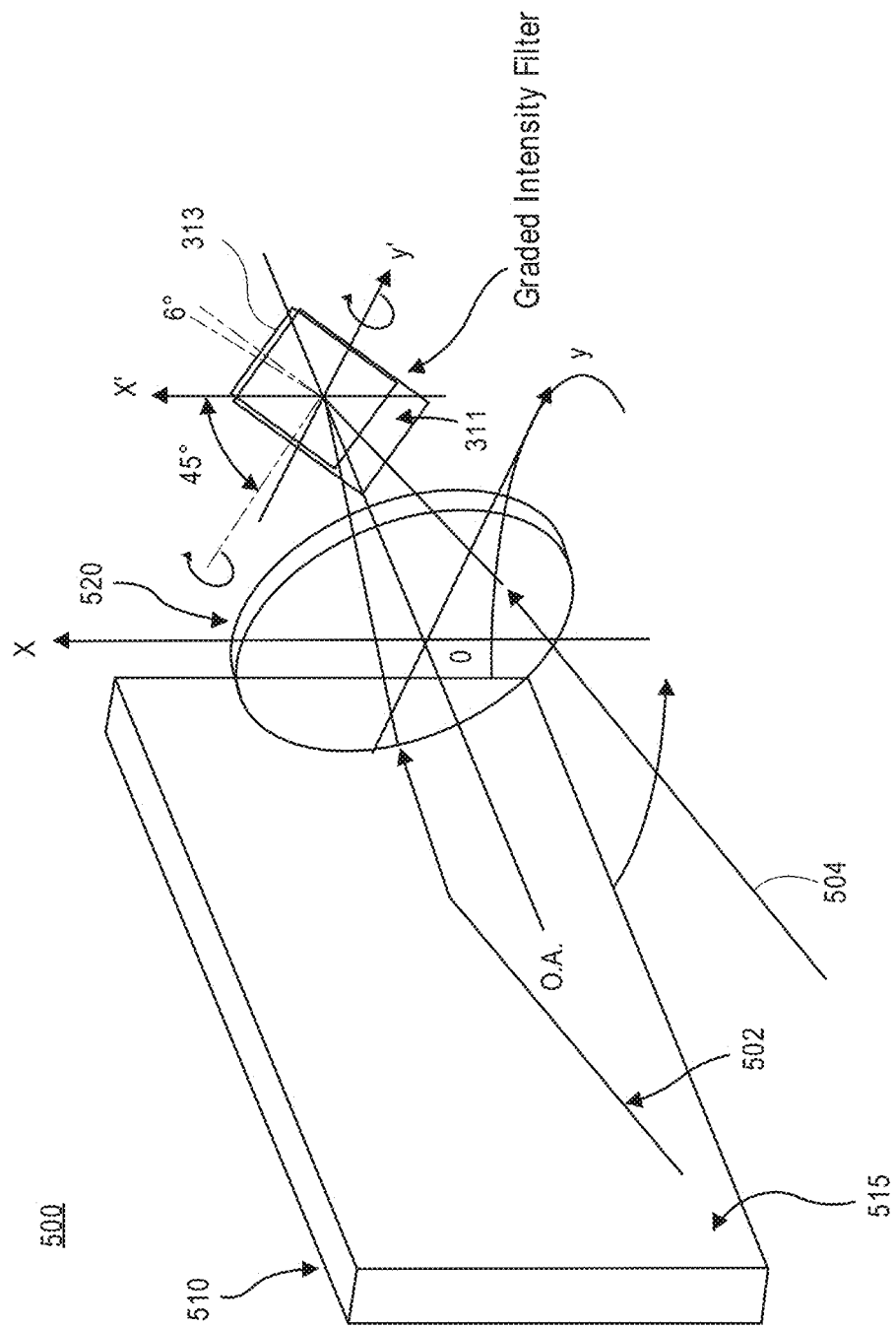
FIG. 5A shows an example IL arrangement for forming chirped gratings on a planar waveguide according to an embodiment.
Figure 5B:
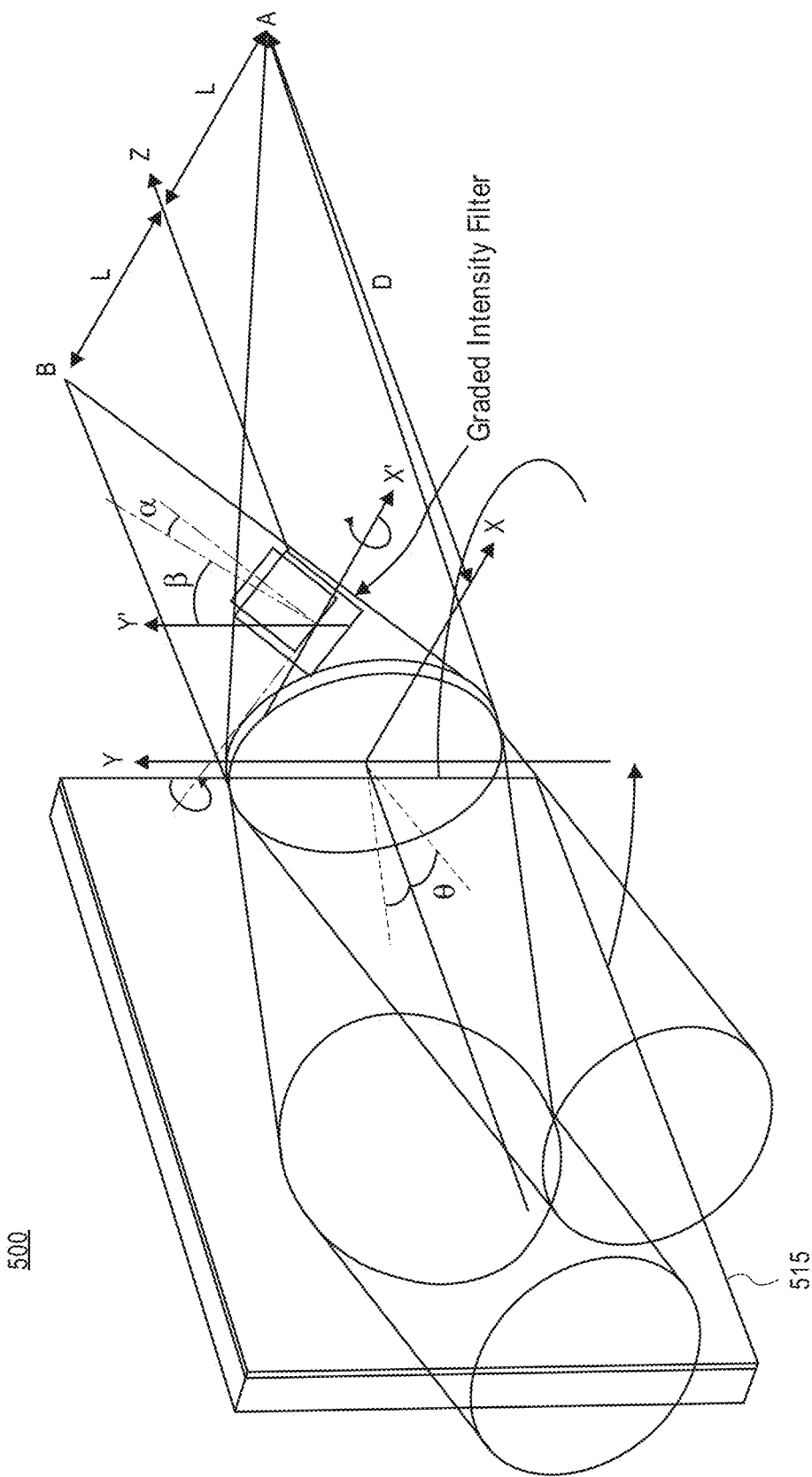
FIG. 5B shows another view of the arrangement of FIG. 5A.

An example IL arrangement is shown in FIGS. 5A-5B. The example IL arrangement 500 in FIG. 5A can be used for imaging a chirped grating pattern onto a substrate (such as substrate 311 with waveguide 313 disposed thereon). As depicted in FIG. 2A, the IL arrangement 500 is shown with the aid of a first three-dimensional coordinate system (x, y, z) tied to the lens 520 and a second coordinate system (x', y', z') tied to the sample (substrate 311/waveguide 313) and tilted about the y (=y') axis, where the optical axis (OA) of lens 520 is along the z-axis direction. A coherent radiation source (not shown) is arranged to produce radiation in the form of a plane (or nearly plane) wave along the z-axis direction toward mirror 510 and lens 520. By way of a non-limiting example, mirror 510 can comprise a flat plane mirror having a reflective surface 515 and lens 520 can comprise a spherical lens for providing a 2D variation or a cylindrical lens to provide a 1D wavefront variation. Mirror 510 and lens 520 are positioned such that radiation from the radiation source is divided evenly such that a first portion 502 of the radiation is provided to mirror 510 and a second portion 504 of radiation is provided to lens 520. Radiation reflected by reflecting surface 515 of mirror 510 is then directed onto and through lens 520. Lens 520 receives both portions of radiation 502 and 504, including the first portion 502 received indirectly from the radiation source by way of reflecting surface 515 of the mirror 510 and the second portion 504 received directly from the radiation source Substrate 311 with waveguide 313 formed thereon is shown in FIG. 5A in relation to the second reference system (x', y', z'). The substrate 311 and waveguide 313 are positioned on the back side away from the entrance face 522 of the lens 520. A top or exposed surface of the waveguide can be pre-coated with a photosensitive resist or photoresist layer (not shown) and be arranged to receive the radiation from lens 520. The photoresist layer is arranged away from the focal plane of the lens 520 so that the radiation impinges upon an area of the waveguide surface. In arrangement 500, with the substrate 311 and waveguide 313 being tilted, and a distance between lens 520 and sample 540 that varies for different parts of the sample surface, the radiation received by the photoresist on the sample 540 has a non-uniform intensity distribution across the sample.

FIG. 5B shows a similar view as that shown in FIG. 5A with the addition of showing the radiation as a bundle of light and showing the geometric relationship among various components of arrangement 500. In implementations, the radiation source produces radiation in the form of a plane wave. Mirror 510 and lens 520 can be arranged such that radiation 502 and 504 is received at the lens 520 at an angle $\theta$ with respect to the optical axis. Lens 520, such as a spherical lens for providing a 2D variation or a cylindrical lens to provide a 1D wavefront variation, can convert the two plane waves into spherical waves with contracting wavefronts towards the lens focus and focuses them to two focal points A and B respectively as shown in FIG. 5A. With the geometric arrangement of FIGS. 5A-5B, focal points A and B will be separated by an equal distance L from the optical axis. In front of the two foci, these two converging spherical waves will interfere in the overlapped zone behind lens 520. The chirped grating pattern from the interference of these two spherical waves will be recorded in a pre-coated photoresist (not shown) on waveguide 311. To adjust the grating period imaged on the photoresist of the sample 440 according to the gain spectral peak of different wafers, the mirror 410 and lens 420 can be rotated relative to the direction of the impinging radiation to vary the incident angle $\theta$ of the interfering beams onto the sample Once the exposure of the photoresist to the radiation is completed, the rest of the processing to transfer the pattern onto the waveguide to form the grates is a standard develop/etch process. Hard mask layers can be used to allow for deeper gratings.

Figure 6A:
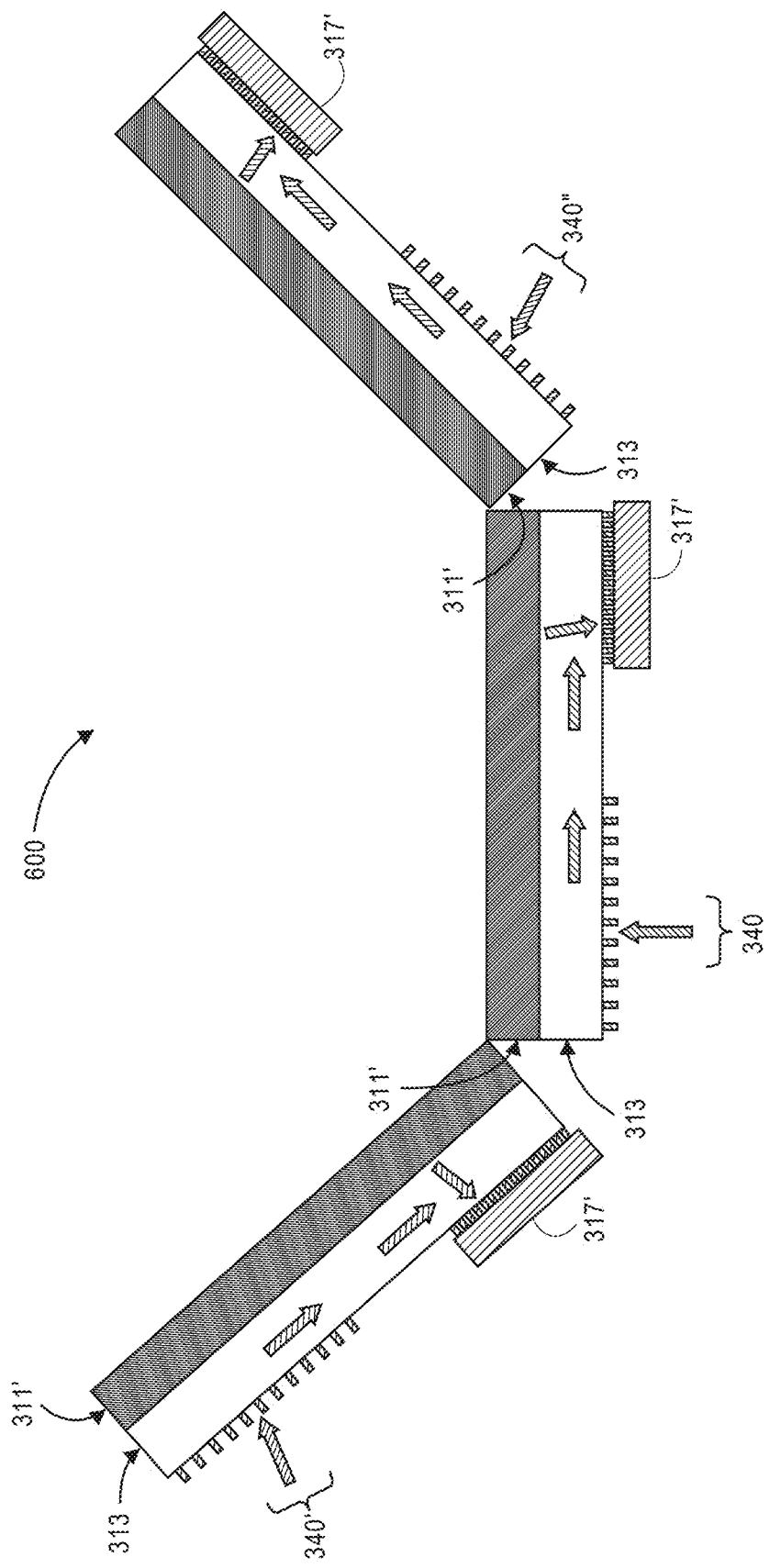
FIGS. 6A-6B are embodiments of plenoptic sensors with that of FIG. 6A showing a multiplicity of spectral sensors mounted at multiple angles to normal to provide a spectral response at multiple angles of incidence and that of FIG. 6B showing a multiplicity of spectral sensor arrays mounted in a plane, wherein each of the spectral sensor arrays comprises different coupling gratings to provide angular sensitivity across a spectral band.
Figure 6B:
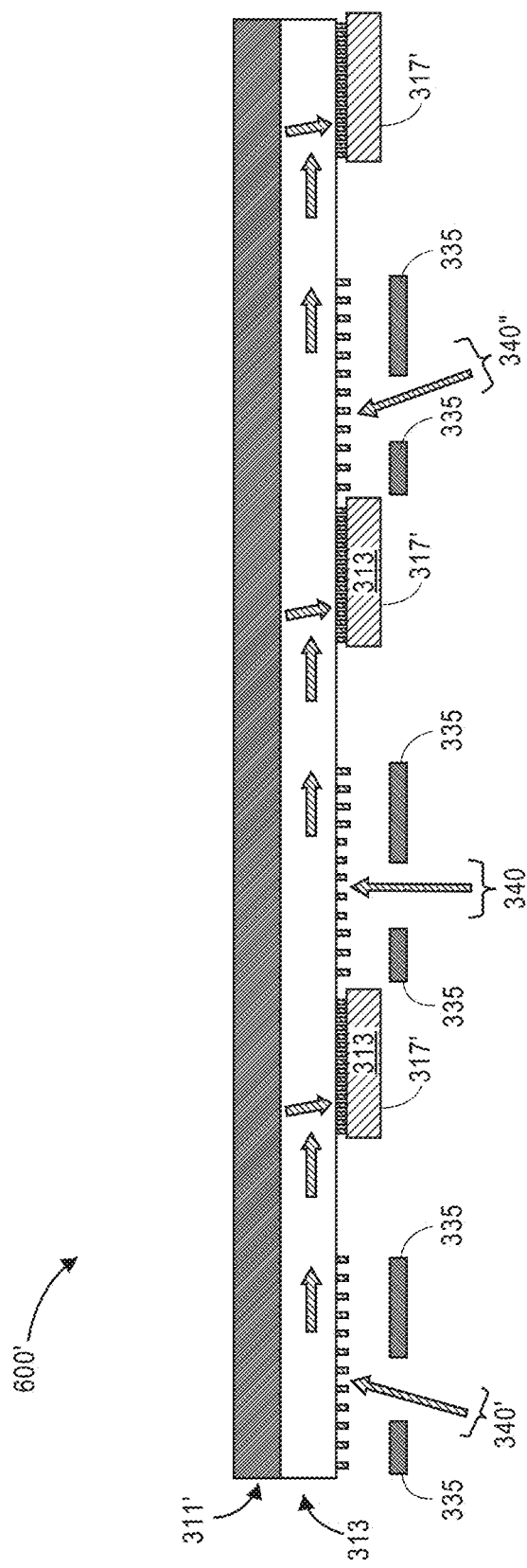

In certain applications, such as ambient lighting, a plenoptic sensor providing the spectrum as a function of angle of incidence is required. This can be accommodated by mounting several ones of the spectral sensor array 300 at a plurality of angles relative to one another, as illustrated in FIG. 6A. Alternatively, as shown in FIG. 6B, different grating periods can be used to provide similar functionality in a low profile planar geometry. It is noted that while the plenoptic sensors 600, 600' are illustrated in FIGS. 6A, 6B as in-plane cross sections, the embodiments are not so limited and additional ones of spectral sensor array 300 may be included, for example, to accept light having incidence out of the plane of the figures. In embodiments, therefore, plenoptic sensors 600, 600' can include additional ones of spectral sensor array 300 at different angles relative to normal, or relative to the other ones of the spectral sensor array 300, and across a plurality of directions relative to the other ones of the spectral sensor array 300 (e.g., two directions to form an cross-shaped plenoptic sensor; or more than two directions to form a star-shaped plenoptic sensor).

The plenoptic sensors described herein may be incorporated in various technologies. One example is LIDAR for autonomous vehicles, where calculation of angular information of incident light (e.g., reflected laser emitted from the LIDAR device at a known wavelength) is needed to determine location of objects.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages may be added or existing structural components and/or processing stages may be removed or modified.

Further, one or more of the acts depicted herein may be carried out in one or more separate acts and/or phases. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C. The term "at least one of" is used to mean one or more of the listed items may be selected. Finally, "exemplary" indicates the description is used as an example, rather than implying that it is an ideal.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A spectral sensor array, comprising:
   a planar waveguide on a substrate;
   a continuously variable chirped input coupling grating, wherein the continuously variable chirped input coupling grating comprises a chirp that has a continuous variation in periodicity in both transverse and longitudinal directions to provide a spectrally selective coupling of incident light that originates from an external source with respect to the spectral sensor array into the planar waveguide;

a restrictor to restrict angular acceptance of the incident light to the chirped input coupling grating;

an output coupling grating; and an array of photodetectors arranged to receive the light coupled out of the waveguide to measure/measure a spectrum of a source of the incident light.

2. The spectral sensor array of claim 1, wherein the chirped input coupling grating comprises a variation of the grating period along a length of the grating, and wherein a spectral composition of light coupled into the waveguide varies as a result of variation of the grating period along the length of the grating.

3. The spectral sensor array of claim 1, further comprising a shield to shield the array of photodetectors from incident light scattered into the detector array without coupling into the planar waveguide.

4. The spectral sensor array of claim 1, wherein the array of photodetectors comprises a linear array.

5. The spectral sensor array of claim 4, wherein the linear array of photodetectors generate an array of electrical signals corresponding to the spectra of the incident light.

6. The spectral sensor array of claim 5, further comprising electronics to receive and condition the electrical signals from the linear array of photodetectors to provide a spectrum of the incident light.

7. The spectral sensor array of claim 6, wherein the electronics to receive and condition the electrical signals from the array of photodetectors is integrated with the array of photodetectors.

8. The spectral sensor array of claim 1, wherein the planar waveguide and the coupling gratings are fabricated on the substrate, wherein the substrate is separate from a substrate of the array of photodetectors.

9. The spectral sensor array of claim 1, wherein the substrate is transparent at predetermined wavelengths of interest.

10. The spectral sensor array of claim 9, wherein the light is incident from a side of the substrate opposite to the planar waveguide.

11. The spectral sensor array of claim 1, wherein the substrate is opaque at predetermined wavelengths of interest.

12. The spectral sensor array of claim 11, wherein the light is incident from a side of the substrate having the planar waveguide.

13. The spectral sensor array of claim 1, wherein the planar waveguide and the array of photodetectors are mechanically coupled so that output light from the output coupling grating is directed to the array of photodetectors.

14. The spectral sensor array of claim 1, wherein the external source is a free-space optical source without any intervening light guides between the external source and the chirped input coupling grating.

* * * * *